(12) United States Patent  
Bak

(10) Patent No.: US 10,205,171 B2  
(45) Date of Patent: Feb. 12, 2019

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventor: Hyo-Rim Bak, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 442 days.

(21) Appl. No.: 14/919,989

(22) Filed: Oct. 22, 2015

(65) Prior Publication Data

US 2016/0126556 A1    May 5, 2016

(30) Foreign Application Priority Data

Oct. 30, 2014    (KR) .................. 10-2014-0149442

(51) Int. Cl.
| | |
|---|---|
| *H01M 4/66* | (2006.01) |
| *H01M 10/052* | (2010.01) |
| *H01M 4/02* | (2006.01) |
| *H01M 4/70* | (2006.01) |

(52) U.S. Cl.
CPC .......... *H01M 4/667* (2013.01); *H01M 4/661* (2013.01); *H01M 4/70* (2013.01); *H01M 10/052* (2013.01); *H01M 2004/027* (2013.01)

(58) Field of Classification Search
CPC .............................. H01M 4/667; H01M 4/661
See application file for complete search history.

(56) References Cited

U.S. PATENT DOCUMENTS

| | | | |
|---|---|---|---|
| 2010/0178559 | A1 | 7/2010 | Mao et al. |
| 2013/0316207 | A1* | 11/2013 | Suwa .................... H01M 10/05 429/94 |

FOREIGN PATENT DOCUMENTS

| | | |
|---|---|---|
| JP | 08-130007 A | 5/1996 |
| KR | 10-2006-0111833 A | 10/2006 |
| KR | 10-2009-0132494 A | 12/2009 |

* cited by examiner

*Primary Examiner* — Ula C Ruddock  
*Assistant Examiner* — Frank A Chernow  
(74) *Attorney, Agent, or Firm* — Lee & Morse, P.C.

(57) ABSTRACT

A negative electrode for a rechargeable lithium battery includes a negative current collector; a negative active material layer on the negative current collector; and a negative electrode tab on an uncoated region of the negative current collector, the uncoated region not having a negative active material coated thereon, wherein the negative electrode tab has a three-layered structure of a nickel layer-copper layer-nickel layer. A rechargeable lithium battery includes the negative electrode.

11 Claims, 3 Drawing Sheets

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2014-0149442, filed on Oct. 30, 2014, in the Korean Intellectual Property Office, and entitled: "Negative Electrode for Rechargeable Lithium Battery and Rechargeable Lithium Battery Including Same," is incorporated by reference herein in its entirety.

BACKGROUND

1. Field

Embodiments are directed to a negative electrode for a rechargeable lithium battery and a rechargeable lithium battery including the same.

2. Description of the Related Art

A rechargeable lithium battery, as a power source for portable small electronic devices, has advantageous characteristics of high-capacity and lightness. Thus, the rechargeable lithium battery is now used for almost all cordless devices. For example, the rechargeable lithium battery may be used for a portable phone, a laptop or the like and also, a cordless power tool such as an electric drill or the like.

SUMMARY

Embodiments are directed to a negative electrode for a rechargeable lithium battery including a negative current collector, a negative active material layer on the negative current collector, and a negative electrode tab on an uncoated region of the negative current collector, the uncoated region not having a negative active material coated thereon. The negative electrode tab has a three-layered structure of a nickel layer-copper layer-nickel layer.

The negative electrode tab may be a clad negative electrode tab.

The negative electrode tab may include about 60 wt % to about 80 wt % of nickel and about 20 wt % to about 40 wt % of copper.

The negative electrode tab may be about 0.09 mm to about 0.11 mm thick.

A combined thickness of nickel layers may be about 1.5 times to about 2.5 times a thickness of the copper layer.

The negative electrode tab may be about 30 mm to about 40 mm long.

Embodiments are also directed to a rechargeable lithium battery including a battery case, an electrode assembly inside the case, and a sealing member sealing the battery case. The electrode assembly includes an electrolyte solution, a negative electrode, a positive electrode and a separator between the negative electrode and the positive electrode. The negative electrode includes a negative current collector, a negative active material layer on the negative current collector, a negative current collector including a negative electrode uncoated region not having an active material coated thereon, and a negative electrode tab on the negative electrode uncoated region. The negative electrode tab has a three-layered structure of a nickel layer-copper layer-nickel layer.

The negative electrode tab may be a clad negative electrode tab.

The rechargeable lithium battery may exhibit a resistance of about 12.0 mΩ to about 20.0 mΩ.

The negative electrode tab may include about 60 wt % to about 80 wt % of nickel and about 20 wt % to about 40 wt % of copper.

The negative electrode tab may be about 0.09 mm to about 0.11 mm thick.

A combined thickness of the nickel layers may be about 1.5 times to about 2.5 times a thickness of the copper layer.

The negative electrode tab may be about 30 mm to about 40 mm long.

The electrolyte solution may include a non-aqueous organic solvent and a lithium salt.

The rechargeable lithium battery may be cylindrical.

The rechargeable lithium battery may be used for a power tool.

BRIEF DESCRIPTION OF THE DRAWINGS

Features will become apparent to those of skill in the art by describing in detail exemplary embodiments with reference to the attached drawings in which:

(In FIG. 2, a negative electrode substrate indicates a negative current collector.)

DETAILED DESCRIPTION

Figure 1:
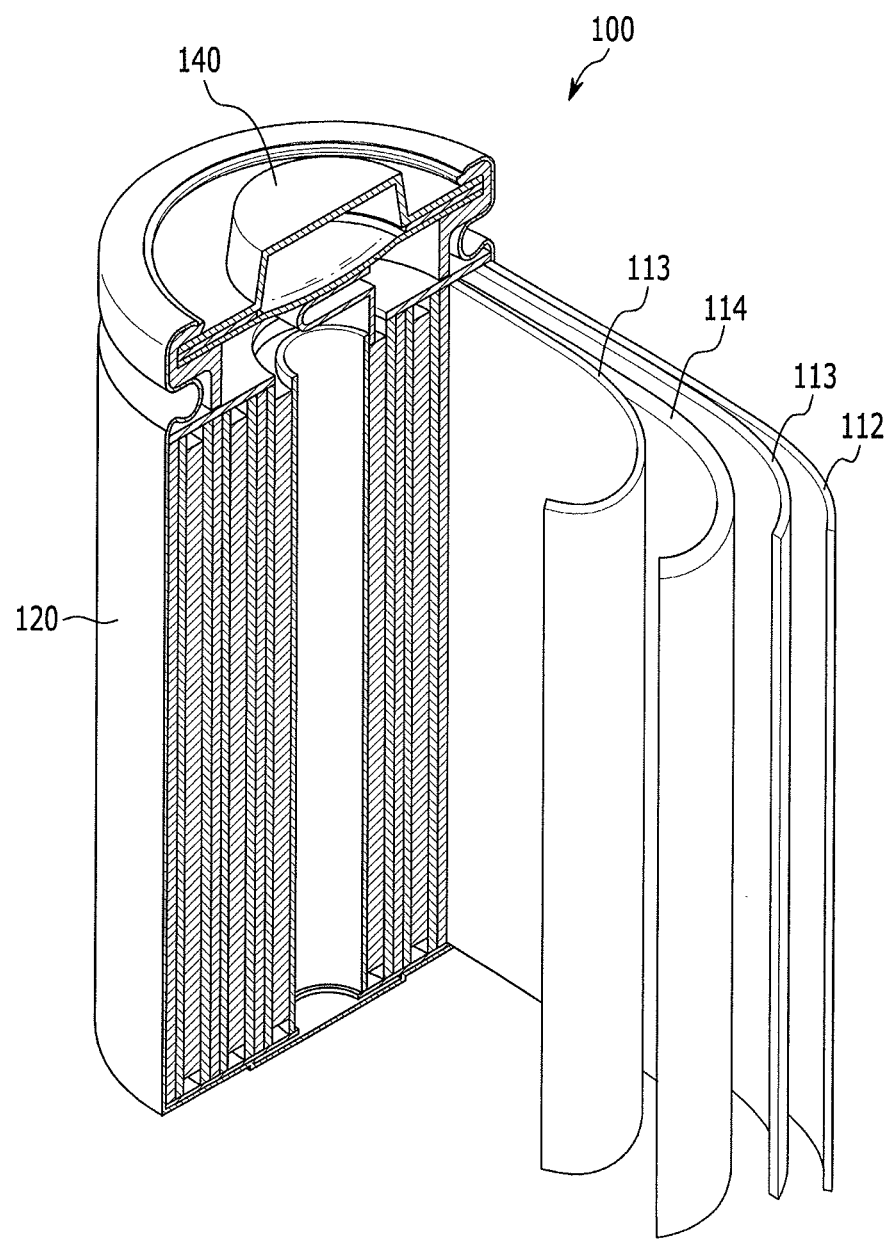
FIG. 1 illustrates a schematic view showing a rechargeable lithium battery according to one embodiment.
Figure 2:
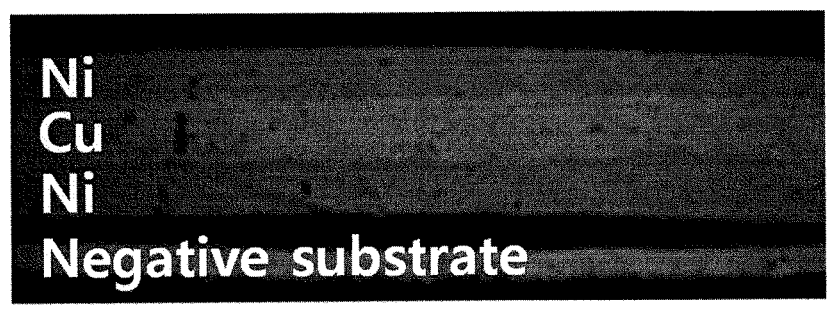
FIG. 2 illustrates a photograph showing negative electrode tab for a rechargeable lithium battery on a negative current collector.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

A negative electrode for a rechargeable lithium battery and a rechargeable lithium battery including the same according to an embodiment are illustrated referring to FIG. 1.

FIG. 1 is a schematic view showing a rechargeable lithium battery according to an embodiment.

Referring to FIG. 1, a rechargeable lithium battery 100 may include an electrode assembly including a positive electrode 114, a negative electrode 112 facing the positive electrode 114, and a separator 113 interposed between the negative electrode 112 and the positive electrode 114, a battery case 120 including the electrode assembly, an electrolyte solution (not shown), and a sealing member 140 sealing the battery case 120.

The negative electrode 112 may include a negative current collector, a negative active material layer on the negative current collector and a negative electrode tab on an uncoated region without a negative active material on the negative current collector, wherein the negative electrode tab has a three-layered structure of a nickel layer-copper layer-nickel layer.

The negative electrode tab may have a three-layered structure of nickel layer-copper layer-nickel layer. The negative electrode tab may provide a high power rechargeable lithium battery having excellent power characteristics.

The negative electrode tab may be a clad negative electrode tab. Herein, the term "clad" indicates that heterogeneous metal plates are compressed and mechanically adhered to each other. For example, the negative electrode tab may be formed by welding nickel and copper with pressure.

A negative electrode tab for a rechargeable lithium battery that is made up of only a nickel monolayer typically has high resistance and thus, does not provide high power characteristics. A negative electrode tab for a rechargeable lithium that is made up of only a copper monolayer battery may cause a minute short circuit in a rechargeable lithium battery due to fine particles produced by spattering. Herein, the term "spattering" refers to thermal elution of copper.

A negative electrode tab having a double-layered structure including nickel and copper may exhibit lower resistance than the negative electrode tab consisting of a nickel monolayer or copper monolayer. However, such a double-layered structure may not prevent copper elution and thus, may still cause the short circuit of a rechargeable lithium battery.

The negative electrode tab having a three-layered structure of nickel layer-copper layer-nickel layer does not cause the copper elution and thus, may prevent a short circuit of a battery, and in addition may provide high power characteristics. For example, nickel has about four times higher resistance than copper. Accordingly, a negative electrode tab including both nickel and copper may have largely decreased resistance as compared to a negative electrode tab consisting of a nickel or copper monolayer and thus, may show high power characteristics. When copper is presented between the nickel layers in the negative electrode tab including both the nickel and the copper, copper elution may be prevented or minimized, and short circuiting of the battery may be avoided.

A battery manufactured using the negative electrode tab may exhibit low resistance of about 12.0 mΩ to about 20.0 mΩ and thus, may exhibit higher power.

The negative electrode tab may include about 60 wt % to about 80 wt % of nickel and about 20 wt % to about 40 wt % of copper. When the nickel is included in an amount greater than about 60 wt %, copper spattering during welding due to excessive copper may be avoided. When the copper is included in an amount of greater than about 20 wt %, or when the nickel is included in an amount of less than about 80 wt %, the resistance decrease effect may be provided.

The thickness of the negative electrode tab may be about 0.09 mm to about 0.11 mm. Herein, the term "thickness" may refer to a distance in a direction perpendicular to the nickel-copper-nickel layers. When the thickness of the negative electrode tab is greater than about 0.09 mm, breakage of the negative electrode tab during the welding and the like may be avoided. When the thickness of the negative electrode tab is less than about 0.11 nm, it may be easier to mount the negative electrode tab, and a prolonged welding process and deteriorated flexibility may be avoided.

In the negative electrode tab, a combined thickness of the nickel layers (i.e. total thickness of two nickel layers) may be about 1.5 times to about 2.5 times as thick as the copper layer.

The length of the negative electrode tab may be about 30 mm to about 40 mm. Herein, the term "length" of the negative electrode tab may refer to a total distance that the negative electrode tab extends on the negative current collector and protrudes from the negative current collector.

When the length of the negative electrode tab is more than about 30 mm, welding may be performed without difficulty. When the length of the negative electrode tab is less than about 40 mm, contact of the negative electrode tab with a positive electrode tab and short circuit of a battery may be avoided.

The negative current collector may be a copper foil, a nickel foil, a stainless steel foil, a titanium foil, a nickel foam, a copper foam, a polymer substrate coated with a conductive metal, or a combination thereof, as examples.

A negative active material layer may be coated on the negative current collector. The term "uncoated region" refers to a region on the negative current collector where the negative active material layer is not coated. The uncoated region may be formed at both ends of the negative current collector. The negative electrode tab may be fixed on the uncoated region and may protrude from the top end of the negative current collector, such that the negative electrode tab may be electrically connected to a sealing member. The negative electrode tab may be wrapped with an insulation tape at the location where the negative electrode tab protrudes to prevent a short circuit between the electrodes.

The negative active material layer may include a negative active material, a binder, and optionally, may include a conductive material.

The negative active material may include a material that reversibly intercalates/deintercalates lithium ions, a lithium metal, a lithium metal alloy, a material being capable of doping and dedoping lithium, or transition metal oxide.

The material that reversibly intercalates/deintercalates lithium ions may be a carbon material suitable for use as carbon-based negative active material rechargeable lithium battery. Examples thereof may include crystalline carbon, amorphous carbon, or a mixture thereof. Examples of the crystalline carbon may include graphite, such as amorphous, sheet-shape, flake, spherical shape or fiber-shaped natural graphite or artificial graphite. Examples of the amorphous carbon may include soft carbon or hard carbon, a mesophase pitch carbonized product, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si—Y alloy (wherein, the Y is an element selected from an alkali metal, an alkaline-earth metal, Group 13 to 16 elements, a transition metal, a rare earth element, and a combination thereof, and is not Si). Sn, $SnO_2$, a Sn—C composite, Sn—Y (wherein, the Y is an element selected from an alkali metal, an alkaline-earth metal, Group 13 to 16 elements, a transition metal, a rare earth element, and a combination thereof, and is not Sn), and the like, and at least one of these may be mixed with $SiO_2$. As examples, Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof.

The transition metal oxide may be vanadium oxide, lithium vanadium oxide, and or like.

The binder improves binding properties of negative active material particles with one another and with a current collector.

Examples of the binder may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. For example, styrene-butadiene rubber may be used.

The binder may be included in an amount of about 0.6 parts by weight to about 1.2 parts by weight based on 100 parts by weight of the negative active material. When the binder is included within this range, negative active material particles may have excellent adherence, and porosity of a negative electrode is improved, resultantly leading to excellent cycle-life characteristics.

The conductive material improves electrical conductivity of an electrode. A suitable electrically conductive material that does not cause a chemical change may be used as the conductive material. Examples thereof may include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer such as a polyphenylene derivative or the like; or a mixture thereof.

According to an embodiment, a rechargeable lithium battery may include a battery case, an electrode assembly inside the battery case, and a sealing member sealing the battery case. The electrode assembly may include an electrolyte solution, a negative electrode, a positive electrode and a separator interposed between the negative electrode and the positive electrode. The negative electrode may include a negative current collector, a negative active material layer on the negative current collector, a negative electrode uncoated region without an active material on the negative current collector, and a negative electrode tab on the uncoated region. The negative electrode tab may have a three-layered structure of a nickel layer-copper layer-nickel layer.

The negative electrode tab may be the same as described above.

The positive electrode 114 may include a positive current collector and a positive active material layer formed on the positive current collector. The positive active material layer may include a positive active material, a binder and optionally a conductive material.

The current collector may be Al, as an example.

The positive active material may include lithiated intercalation compounds that reversibly intercalate and deintercalate lithium ions. For example, at least one composite oxide of lithium and a metal of cobalt, manganese, nickel, or a combination thereof may be used. Examples include a compound represented by one of the following chemical formulae:

$Li_aA_{1-b}B_bD_2$ ($0.90 \leq a \leq 1.8$ and $0 \leq b \leq 0.5$) $Li_aE_{1-b}B_bO_{2-c}D_c$ ($0.90 \leq a \leq 1.8$, $0 \leq b \leq 0.5$, $0 \leq c \leq 0.05$); $Li_aE_{2-b}B_bO_{4-c}D_c$ ($0.90 \leq a \leq 1.8$, $0 \leq b \leq 0.5$, $0 \leq c \leq 0.05$); $Li_aNi_{1-b-c}Co_bB_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ ($0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A, B, D, E, F, G, Q, I, and J represent variables as further defined. In particular, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds may have a coating layer on the surface, or may be mixed with another compound having a coating layer. The coating layer may include at least one coating element compound selected from the group of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound. For example, the method may include any coating method such as spray coating, dipping, or the like.

The binder improves binding properties of positive active material particles with one another and with a current collector. Specific examples include polyvinyl alcohol, carboxymethyl cellulose, hydroxypropyl cellulose, diacetyl cellulose, polyvinylchloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material provides an electrode with conductivity. A suitable electrically conductive material that does not cause a chemical change may be used as the conductive material. Examples of the conductive material include one or more of natural graphite, artificial graphite, carbon black, acetylene black, ketjen black, a carbon fiber, copper, a metal powder or a metal fiber including nickel, aluminum, silver, or the like, or a polyphenylene derivative.

The negative electrode 112 and the positive electrode 114 may be respectively manufactured by a method including mixing an active material, a conductive material, and a binder into an active material composition and coating the composition onto a current collector. The active material composition may include a solvent, such as N-methylpyrrolidone or the like.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When a linear carbonate compound and a cyclic carbonate compound are mixed, a solvent having a high dielectric constant and a low viscosity may be provided. The cyclic carbonate compound and linear carbonate compound may be mixed together in a volume ratio ranging from about 1:1 to about 1:9.

The ester-based solvent may include, for example, methylacetate, ethylacetate, n-propyl acetate, dimethylacetate, methylpropionate, ethylpropionate, γ-butyrolactone, decanolide, valerolactone, mevalonolactone, caprolactone, or the like. The ether-based solvent may include, for example, dibutylether, tetraglyme, diglyme, dimethoxyethane, 2-methyltetrahydrofuran, tetrahydrofuran, or the like. The ketone-based solvent may include cyclohexanone, or the like. The aprotic solvent may include, e.g., at least one of nitriles such as R—CN (wherein R is a C2 to C20 linear, branched, or cyclic hydrocarbon group that may include a double bond, an aromatic ring, or an ether bond), amides such as dimethylformamide, dioxolanes such as 1,3-dioxolane, sulfolanes, and the like. The alcohol-based solvent may include ethyl alcohol, isopropyl alcohol, or the like.

The non-aqueous organic solvent may be used singularly or in a mixture, and when the organic solvent is used in a mixture, the mixture ratio may be controlled in accordance with a desirable battery performance.

The non-aqueous electrolyte may further include an overcharge inhibitor such as ethylene-based carbonate, pyrocarbonate, or the like. The ethylene-based carbonate may be the ethylene carbonate-based compound and may include difluoroethylene carbonate, chloroethylene carbonate, dichloroethylene carbonate, bromoethylene carbonate, dibromoethylene carbonate, nitroethylene carbonate, cyanoethylene carbonate or fluoroethylene carbonate, or the like.

The lithium salt may be dissolved in an organic solvent. The lithium salt supplies lithium ions in a battery, basically operates the rechargeable lithium battery, and improves lithium ion transportation between positive and negative electrodes therein.

Specific examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, LiN $LiN(C_xF_{2x+1}SO_2)(C_yF_{2y+1}SO_2)$, wherein x and y are natural numbers, and e.g. an integer of 1 to 20, $LiPO_2F_2$, LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 may be a single layer or a multilayer. The separator 113 may be made of, for example polyethylene, polypropylene, polyvinylidene fluoride or a combination thereof.

The rechargeable lithium battery may be a cylindrical battery. For example, the battery case may be cylindrical and may be formed by a deep drawing method or the like by using iron, an aluminum alloy and the like. The electrode assembly may form a cylindrical jelly-roll.

The rechargeable lithium battery may provide high power characteristics and may be used for a power tool.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Manufacture of Negative Electrode

Example 1

98 parts by weight of a negative active material including Si and graphite (5.5:94.5 weight ratio), 1 part by weight of a styrene-butadiene rubber as a binder, and 1 part by weight of carbon black as a conductive material were dispersed into N-methyl-2-pyrrolidone, preparing a composition for forming a negative active material layer.

The composition for a negative active material layer was coated onto a Cu-foil current collector, and then, a clad negative electrode tab having a three-layered structure of a 0.1 mm-thick and 35 mm-long nickel layer-copper layer-nickel layer (nickel: 70 wt %, copper: 30 wt %, the combined thickness of the nickel layers was twice a thickness of the copper layer) was formed on the uncoated region of the Cu-foil current collector on which the negative active material layer was not coated, manufacturing a negative electrode.

Example 2

A composition for a negative active material layer was prepared by mixing 98 parts by weight of a negative active material including Si, 1 part by weight of a styrene-butadiene rubber and 1 part by weight of carbon black as a conductive material and dispersing the mixture into N-methyl-2-pyrrolidone.

Next, the composition for a negative active material layer was coated onto a glass plate to form a negative active material layer, the negative active material layer was coated onto a Cu-foil current collector, and a clad negative electrode tab having a three-layered structure of a 0.1 mm-thick and 35 mm-long nickel layer-copper layer-nickel layer (nickel: 60 wt %, copper: 40 wt %) was formed on the uncoated region of the Cu-foil current collector on which the negative active material layer was not coated, manufacturing a negative electrode.

Comparative Example 1

A negative electrode was manufactured according to the same method as Example 1 except for using a negative electrode tab consisting of a nickel monolayer instead of the clad negative electrode tab having a three-layered structure of nickel layer-copper layer-nickel layer.

Comparative Example 2

A negative electrode was manufactured according to the same method as Example 1 except for using a negative electrode tab having a nickel-copper double structure instead of the clad negative electrode tab having a three-layered structure of nickel layer-copper layer-nickel layer.

Evaluation
Evaluation 1: Resistance

The negative electrodes according to Examples 1 and 2 and Comparative Examples 1 and 2 were applied to manufacture each battery cell. At this time, a positive electrode including $LiNi_{0.8}Co_{0.15}Al_{0.5}O_2$ positive active material was used, and an electrolyte in which 1.5M LiPF$_6$ was dissolved in a mixed solvent of ethylene carbonate, ethylmethyl carbonate and dimethyl carbonate (2:2:6 volume ratio), 3 wt % of fluoroethylene carbonate, 0.2 wt % of LiBF$_4$, 1 wt % of lithium bis(oxalato) borate, 0.5 wt % trimethylsilyl borate, 1 wt % of LiPO$_2$F$_2$ and 1.5 wt % of succino nitrile was added thereto. The battery cells were formation charged and discharged by charging them at 0.2 C and 4.2V, pausing for 20 minutes, discharging at 1.0 C, pausing for 55 minutes, charging at 0.5 C and 4.2V under a cut-off of 75 mA, discharging at 0.2 C under a cut-off of 2.5V, and full-charged at 4 A and 4.2V under cut-off of 100 mA.

AC IR for the resulting battery cells were measured using a resistance meter (a HIOKI meter)), and the results are provided in the following Table 1.

Furthermore, the full-charge cells were discharged at 10 A for 10 seconds, 1 A for 10 seconds, and 10 A for 10 seconds, and the voltage differences and currents differences between the currents at 18 seconds and 23 seconds during the discharges were measured to obtain the DC IR. The results are provided in the following Table 1.

TABLE 1

|  | IR3 (mΩ) | AC IR (mΩ) | DC IR (mΩ) |
| --- | --- | --- | --- |
| Example 1 (Ni—Cu—Ni) | 12.9 | 12.4 | 19.35 |
| Example 2 (Ni—Cu—Ni) | 13.0 | 12.5 | 19.52 |
| Comparative Example 1 (Ni) | 13.9 | 12.9 | 20.02 |
| Comparative Example 2 (Ni—Cu) | 14.0 | 13.2 | 21.0 |

Referring to the Table 1, as for internal resistance IR3, the battery cell of Example 1, using the clad negative electrode tab having a three-layered structure of nickel layer-copper layer-nickel layer, showed 1 mΩ lower resistance than the battery cell of Comparative Example 1, using the negative electrode tab having a nickel monolayer, in a full-discharge and 1.1 mΩ lower resistance the battery cell of Comparative Example 2, using the negative electrode tab having a nickel and copper double structure, and the battery cell of Example 2 showed lower resistance than the battery cells of Comparative Examples 1 and 2.

As for AC internal resistance (AC IR), the battery cell of Example 1 showed 0.5 mΩ lower resistance than the battery cell of Comparative Example 1 in a full-charge state and 0.8 mΩ lower resistance than the battery cell of Comparative Example 2. The battery cell of Example 2 showed lower resistance than the battery cells of Comparative Examples 1 and 2.

As for DC internal resistance (DC IR), the battery cell of Example 1 showed 0.67 mΩ lower resistance than the battery cell of Comparative Example 1 in a full-charge state and 1.65 mΩ lower resistance than the battery cell of Comparative Example 2. The battery cell of Example 2 showed lower resistance than the battery cells of Comparative Examples 1 and 2.

The negative electrodes using a clad negative electrode tab having a three-layered structure of nickel layer-copper layer-nickel layer according to Examples 1 and 2 had lower resistance and thus, higher power characteristics than the negative electrode using a negative electrode tab having a nickel monolayer according to Comparative Example 1 or the negative electrode using a negative electrode tab having a nickel and copper double structure according to Comparative Example 2.

Manufacture of Rechargeable Lithium Battery Cell

The negative electrodes according to Examples 1 and 2 and Comparative Examples 1 and 2 were respectively used. The negative electrode and a positive electrode including a LiNi$_{0.8}$Co$_{0.15}$Al$_{0.5}$O$_2$ positive active material, were used to manufacture a battery cell. Herein, an electrolyte solution was prepared by mixing ethylenecarbonate (EC), ethylmethylcarbonate (EMC), and dimethylcarbonate (DMC) in a volume ratio of 2:2:6 and dissolving 1.5 M LiPF$_6$ in the mixed solution.

Evaluation 2: High Rate Cycle-Life Characteristics

Figure 3:
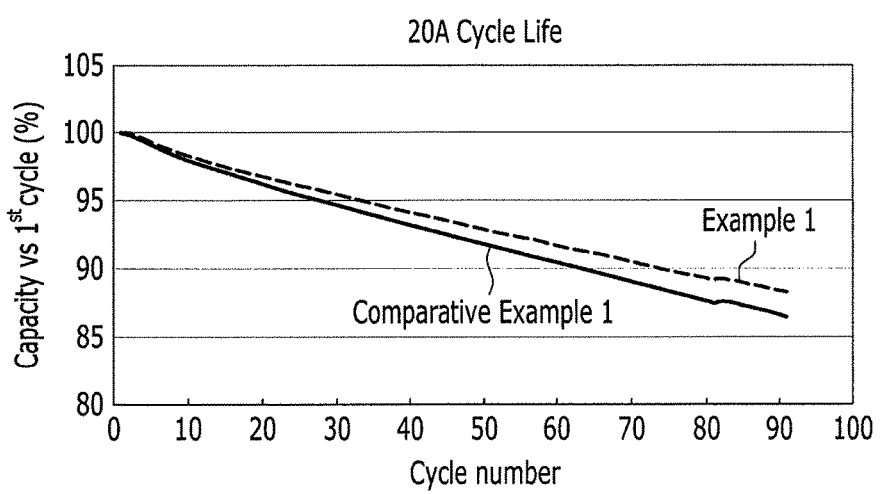
FIG. 3 illustrates a graph showing high rate cycle-life characteristics of rechargeable lithium battery cells according to Example and Comparative Example.

High rate cycle-life characteristics of the rechargeable lithium battery cells according to Examples 1 and 2 and Comparative Examples 1 and 2 were measured, and the results are provided in FIG. 3.

The rechargeable lithium battery cells were charged in a CC/CV mode at 4.0 A, their cut-off voltages were maintained at 4.2 V, and their charges ended at 100 mA. The rechargeable lithium battery cells were discharged in a CC mode at 20 A, and their cut-off voltages were maintained at 2.5 V.

FIG. 3 illustrates a graph showing high rate cycle-life characteristics of the rechargeable lithium battery cells according to Example 1 and Comparative Example 1.

Referring to FIG. 3, the rechargeable lithium battery cell according to Example 1 showed a lower capacity decrease rate than that of Comparative Example 1 and thus, showed excellent high rate cycle-life characteristics.

By way of summation and review, a rechargeable lithium battery may be manufactured by inserting an electrode assembly along with an electrolyte solution into a battery case and sealing the top opening of the battery case with a sealing member. The electrode assembly may include a negative electrode, a positive electrode, and a separator.

The positive electrode may have a tab formed of aluminum (Al) or an aluminum alloy, while a negative electrode commonly has a tab formed of nickel (Ni) or a nickel alloy. However, a negative electrode tab formed of the nickel (Ni) or nickel alloy may generate a large amount of heat during charge and discharge of the rechargeable lithium battery due to high resistance of the nickel (Ni) itself. A battery used for a power tool requires a higher output than one used for a laptop or the like, but the negative electrode tab formed of the nickel (Ni) or nickel alloy has a low power due to high resistance and may not provide high power characteristics Embodiments provide a negative electrode for a rechargeable lithium battery. Embodiments also provide a rechargeable lithium battery including the negative electrode. The rechargeable lithium battery may have excellent power characteristics, high rate cycle-life characteristics, and a high capacity.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof the present invention as set forth in the following claims.

What is claimed is:

1. A negative electrode for a rechargeable lithium battery, the negative electrode comprising:
   a negative current collector;
   a negative active material layer on the negative current collector; and a negative electrode tab on an uncoated region of the negative current collector, the uncoated region not having a negative active material coated thereon, wherein the negative electrode tab has a three-layered structure of a nickel layer-copper layer-nickel layer, wherein the negative electrode tab includes about 60 wt % to about 80 wt % of nickel and about 20 wt % to about 40 wt % of copper.

2. The negative electrode for a rechargeable lithium battery as claimed in claim 1, wherein the negative electrode tab is a clad negative electrode tab.

3. The negative electrode for a rechargeable lithium battery as claimed in claim 1, wherein the negative electrode tab is about 0.09 mm to about 0.11 mm thick.

4. The negative electrode for a rechargeable lithium battery as claimed in claim 1, wherein a combined thickness of nickel layers is about 1.5 times to about 2.5 times a thickness of the copper layer.

5. The negative electrode for a rechargeable lithium battery as claimed in claim 1, wherein the negative electrode tab is about 30 mm to about 40 mm long.

6. A rechargeable lithium battery, comprising a battery case;

an electrode assembly inside the battery case, the electrode assembly including an electrolyte solution, a negative electrode, a positive electrode and a separator between the negative electrode and the positive electrode, wherein the negative electrode includes a negative current collector, a negative active material layer on the negative current collector, a negative current collector including a negative electrode uncoated region not having an active material coated thereon, and a negative electrode tab on the negative electrode uncoated region; and a sealing member sealing the battery case, wherein the negative electrode tab has a three-layered structure of a nickel layer-copper layer-nickel layer, wherein the negative electrode tab includes about 60 wt % to about 80 wt % of nickel and about 20 wt % to about 40 wt % of copper.

7. The rechargeable lithium battery as claimed in claim 6, wherein the negative electrode tab is a clad negative electrode tab.

8. The rechargeable lithium battery as claimed in claim 6, exhibiting a resistance of about 12.0 mΩ to about 20.0 mΩ.

9. The rechargeable lithium battery as claimed in claim 6, wherein the negative electrode tab is about 0.09 mm to about 0.11 mm thick.

10. The rechargeable lithium battery as claimed in claim 6, wherein a combined thickness of the nickel layers is about 1.5 times to about 2.5 times a thickness of the copper layer.

11. The rechargeable lithium battery as claimed in claim 6, wherein the negative electrode tab is about 30 mm to about 40 mm long.

\* \* \* \* \*